(12) United States Patent
Byun et al.

(10) Patent No.: US 12,537,775 B2
(45) Date of Patent: Jan. 27, 2026

(54) APPARATUS AND METHOD FOR TRANSMITTING DATA IN TIME SENSITIVE NETWORK

(71) Applicant: Korea Railroad Research Institute, Uiwang-si (KR)

(72) Inventors: Il Mu Byun, Gyeonggi-do (KR); Kyeong Jun Ko, Seoul (KR); Woo Jin Ahn, Gyeonggi-do (KR); Young Ju Kim, Gyeonggi-do (KR); Sung Soo Park, Gyeonggi-do (KR)

(73) Assignee: KOREA RAILROAD RESEARCH INSTITUTE, Uiwang-si (KR)

( * ) Notice: Subject to any disclaimer, the term of this patent is extended or adjusted under 35 U.S.C. 154(b) by 12 days.

(21) Appl. No.: 18/640,792

(22) Filed: Apr. 19, 2024

(65) Prior Publication Data
US 2024/0267337 A1 Aug. 8, 2024

Related U.S. Application Data

(63) Continuation of application No. PCT/KR2022/013207, filed on Sep. 2, 2022.

(30) Foreign Application Priority Data

Oct. 21, 2021 (KR) ........................ 10-2021-0141320

(51) Int. Cl.
  *G06F 15/16* (2006.01)
  *H04L 12/46* (2006.01)
  *H04L 47/28* (2022.01)
(52) U.S. Cl.
  CPC .............. *H04L 47/28* (2013.01); *H04L 12/46* (2013.01)

(58) Field of Classification Search
  CPC ..... H04L 47/28; H04L 12/46; H04L 47/2491; H04W 8/04; H04W 28/02
  See application file for complete search history.

(56) References Cited

U.S. PATENT DOCUMENTS 6,917,614 B1 * 7/2005 Laubach ................. H04L 47/10
                                                                370/392
9,712,463 B1 * 7/2017 Hughes ................... H04L 49/70
(Continued)

FOREIGN PATENT DOCUMENTS

KR    10-2021-0108444 A    9/2021
KR    10-2021-0112380 A    9/2021
(Continued)

OTHER PUBLICATIONS

T.K. Kang, et al.,"Research Trend in Ultra-Low Latency Networking for Fourth Industrial Revolution", Electronics and Telecommunications Trends, Dec. 2019, pp. 108-122, vol. 34, No. 6.
(Continued)

*Primary Examiner* — Razu A Miah
(74) *Attorney, Agent, or Firm* — Sughrue Mion, PLLC (57) ABSTRACT

A method for transmitting data using a time sensitive network (TSN). A first communication device includes a first terminal and a first TSN bridge, and the second communication device includes a second terminal and a second virtual TSN bridge. In the method, the first terminal transmits a virtual TSN bridge connection request to the first virtual TSN bridge. The first virtual TSN bridge transmits a virtual TSN port information request to the second virtual TSN bridge according to the virtual TSN bridge connection request. The second virtual TSN bridge transmits, to the first virtual TSN bridge, information related to a virtual TSN port included in the second virtual TSN bridge. The first virtual TSN bridge determines, based on the information related to the virtual TSN port, a plurality of virtual TSN ports to be
(Continued)

used for communication with the second virtual TSN bridge in the first virtual TSN bridge.

13 Claims, 4 Drawing Sheets

(56) References Cited

U.S. PATENT DOCUMENTS

| | | | | |
|---|---|---|---|---|
| 2005/0063395 | A1* | 3/2005 | Smith | H04L 12/46 370/399 |
| 2005/0083949 | A1* | 4/2005 | Dobbins | H04L 12/467 370/395.53 |
| 2013/0219384 | A1* | 8/2013 | Srinivasan | H04L 12/462 718/1 |
| 2014/0013324 | A1* | 1/2014 | Zhang | H04L 49/70 718/1 |
| 2014/0047125 | A1* | 2/2014 | Hyoudou | H04L 12/46 709/232 |
| 2014/0280738 | A1* | 9/2014 | Kolker | H04L 12/46 709/218 |
| 2016/0087886 | A1* | 3/2016 | Hughes | H04L 61/106 370/254 |
| 2020/0211363 | A1* | 7/2020 | Chen | G05B 19/0423 |
| 2020/0267785 | A1* | 8/2020 | Talebi Fard | H04L 45/04 |
| 2021/0219357 | A1 | 7/2021 | Fard et al. | |
| 2021/0274375 | A1* | 9/2021 | Li | H04W 28/10 |
| 2021/0345157 | A1 | 11/2021 | Ke et al. | |
| 2021/0368331 | A1 | 11/2021 | Ke | |
| 2022/0166677 | A1* | 5/2022 | Jabbar | H04L 47/28 |
| 2023/0254755 | A1* | 8/2023 | Talebi Fard | H04W 40/246 370/256 |
| 2023/0388193 | A1* | 11/2023 | Jabbar | H04L 41/12 |

FOREIGN PATENT DOCUMENTS

| | | |
|---|---|---|
| KR | 10-2021-0120065 A | 10/2021 |
| WO | 2020/165857 A1 | 8/2020 |
| WO | 2020/194113 A1 | 10/2020 |
| WO | 2020/252625 A1 | 12/2020 |

OTHER PUBLICATIONS

International Search Report for PCT/KR2022/013207 dated Dec. 15, 2022 (PCT/ISA/210).
Extended European Search Report dated Jul. 17, 2025 in Application No. 22883768.8.
Ericsson, et al., "5G bridge granularity", 3GPP TSG-SA WG2 Meeting #132 S2-1903364, Xi'an—China, Apr. 8-12, 2019. (6 pages).

* cited by examiner

APPARATUS AND METHOD FOR TRANSMITTING DATA IN TIME SENSITIVE NETWORK

CROSS-REFERENCE TO RELATED APPLICATION

The present application is a continuation of International Application No. PCT/KR2022/013207, filed Sep. 2, 2022, which is based upon and claims priority to Korean Patent Application No. 10-2021-0141320, filed on Oct. 21, 2021 in Korea. The entire disclosure of the above application is incorporated herein by reference.

BACKGROUND

The present invention relates to an apparatus and a method for transmitting data.

In a time sensitive network (TSN), an accumulated latency is defined for each stream when a communication connection is set up between terminals, and a determination is made that a stream connection is disconnected when an accumulated delay value changes. In a wired network, a latency time is constant because communication devices are connected by wire, but in a wireless network, the latency time changes as the communication devices move. As a result, when a virtual TSN bridge formed through wireless communication moves, a stream connection may be disconnected due to change in accumulated latency. This means that the disconnection and re-setup of the stream connection must be repeated when the communication device is moved, which places a large burden on the network and makes continuous provision of a communication service difficult. Therefore, a technology for enabling wireless communication devices to operate as stable virtual bridges is needed.

A time sensitive network of the Institute of Electrical and Electronics Engineers (IEEE) 802.1Q standard uses stream reservation protocol (SRP) in order to set up a stream. The SRP is basically a distributed type in which devices constituting a network transmit or receive information to or from each other to set up streams without a central control device. Further, as an improved function of the SRP in IEEE 802.11Qcc, a function of a centralized network configuration (CNC) serving as a central control device to set up a network stream has been added.

In both a centralized type and a distributed type, accumulated latency is used as a parameter when a stream is reserved and a domain for signal transmission is formed. In the case of the distributed type, when signals are transmitted and received to form the stream, devices on a path add their own latency times to calculate the accumulated latency. When there is a CNC, the CNC receives and stores latency information from devices constituting network, and the terminals calculates the accumulated delay using the stored information when the terminals form a stream. In this case, the accumulated latency is a main parameter for stream reservation. In the IEEE 802.1Q standard, when a accumulated latency time of a specific stream changes, the stream is declared as fail.

Since the time sensitive network has been developed assuming a wired network, the stream reservation is declared as fail when the accumulated latency time changes. However, when there is a wireless communication link in the time sensitive network, a problem that stream setup is declared as fail may frequently occur due to change in the accumulated latency time. This is because the accumulated latency time can easily change due to dynamic change in communication channel of the wireless communication link. Accordingly, a need to solve the above-described problem is increasing as introduction of wireless communication expands in the time sensitive network.

SUMMARY

Embodiments of the present invention provide an apparatus and a method for transmitting data in which a set up stream is made seamless by using a time sensitive network even when a communication device moves.

In accordance with some embodiments of the present disclosure, a method comprises transmitting data between a first communication device including a first terminal and a first virtual time sensitive network (TSN) bridge and a second communication device including a second terminal and a second virtual TSN bridge, the method for transmitting data comprising: transmitting, by the first terminal, the virtual TSN bridge connection request to the first virtual TSN bridge; transmitting, by the first virtual TSN bridge, a virtual TSN port information request to the second virtual TSN bridge according to a virtual TSN bridge connection request; transmitting, by the second virtual TSN bridge, information related to a virtual TSN port included in the second virtual TSN bridge to the first virtual TSN bridge; and determining, by the first virtual TSN bridge, a plurality of virtual TSN ports to be used for communication between the first virtual TSN bridge and the second virtual TSN bridge based on the information related to the virtual TSN port.

In an embodiments of the present disclosure, wherein the virtual TSN bridge connection request includes at least one of identification information of the second virtual TSN bridge, and a time stamp, the virtual TSN port information request includes at least one of the number of virtual TSN port groups included in the first virtual TSN bridge, the number of virtual TSN ports for each virtual TSN port group included in the first virtual TSN bridge, a latency time between the first virtual TSN bridge and the first terminal, and a time stamp, and the information related to the virtual TSN port includes at least one of the number of virtual TSN port groups that have received the virtual TSN port information request among virtual TSN port groups included in the second virtual TSN bridge, the number of virtual TSN ports for each virtual TSN port group that has received the virtual TSN port information request, a latency time taken for the virtual TSN port information request for each virtual TSN port group that has received the virtual TSN port information request to travel from the first virtual TSN bridge to the second virtual TSN bridge, a latency time between the second virtual TSN bridge and the second terminal, and a time stamp.

In an embodiments of the present disclosure, wherein the transmitting of the virtual TSN port information request includes transmitting, by the first virtual TSN bridge, the virtual TSN port information request to the second virtual TSN bridge through a wireless communication technology corresponding to each of one or more virtual TSN port groups included in the first virtual TSN bridge, and the transmitting of the information related to the virtual TSN port includes transmitting, by the second virtual TSN bridge, the information related to the virtual TSN port to the first virtual TSN bridge through a wireless communication technology corresponding to each of one or more virtual TSN port groups included in the second virtual TSN bridge.

In an embodiments of the present disclosure, wherein the determining of the plurality of virtual TSN ports includes determining, by the first virtual TSN bridge, virtual TSN port groups that have received the information related to the virtual TSN port among virtual TSN port groups included in the first virtual TSN bridge; determining, by the first virtual TSN bridge, the virtual TSN ports included in the virtual TSN port groups that have received the information related to the virtual TSN port as virtual TSN ports to be used for communication with the second virtual TSN bridge; and calculating, by the first virtual TSN bridge, a latency time taken for the information related to the virtual TSN port for each virtual TSN port group that has received the information related to the virtual TSN port to travel from the second virtual TSN bridge to the first virtual TSN bridge.

In accordance with some embodiments of the present disclosure, a method further comprises: transmitting, by the first virtual TSN bridge, virtual TSN bridge connection information to the first terminal, wherein the virtual TSN bridge connection information includes at least one of the identification information of the second virtual TSN bridge, the number of virtual TSN port groups to be used for communication with the second virtual TSN bridge, the number of virtual TSN ports for each virtual TSN port group to be used for the communication, and a latency times between the first terminal and the second terminal for each virtual TSN port group to be used for the communication.

In accordance with some embodiments of the present disclosure, a method comprises: transmitting, by the first terminal, a stream setup request to the first virtual TSN bridge; determining, by the first virtual TSN bridge, a plurality of streams to be used for communication with the second virtual TSN bridge based on the stream setup request; determining, by the first virtual TSN bridge, the virtual TSN ports to be mapped to the plurality of streams among the plurality of virtual TSN ports based on the number of the plurality of streams; mapping, by the first virtual TSN bridge, the virtual TSN ports to be mapped to the plurality of streams, to wireless data transmission sessions; and transmitting, by the first virtual TSN bridge, stream setup information to the first terminal.

In an embodiments of the present disclosure, wherein the stream setup request includes at least one of the number of stream groups and quality of service (QoS) for each stream group, and the stream setup information includes at least one of the number of streams for each stream group, QoS for each stream group, the number of virtual TSN ports determined for each virtual TSN port group, and information on whether or not the virtual TSN port is activated.

In an embodiments of the present disclosure, wherein the determining of the plurality of streams includes calculating, by the first virtual TSN bridge, a latency time between the first terminal and the second terminal for each of the plurality of virtual TSN ports; extracting, by the first virtual TSN bridge, reliability, data rate, and traffic characteristics for each of the plurality of virtual TSN ports; and determining, by the first virtual TSN bridge, the number of streams included in each of the stream groups, and QoS for each stream.

In an embodiments of the present disclosure, wherein the determining of the virtual TSN ports to be mapped to the plurality of streams includes determining, by the first virtual TSN bridge, the number of virtual TSN ports to be mapped to the plurality of streams so that the number is larger than the number of streams included in each of the stream groups; determining, by the first virtual TSN bridge, the number of wireless data transmission sessions; and extracting, by the first virtual TSN bridge, QoS for each wireless data transmission session.

In an embodiments of the present disclosure, wherein the mapping includes: deactivating, by the first virtual TSN bridge, the virtual TSN port mapped to the wireless data transmission session that is not connected to the second virtual TSN bridge or does not satisfy QoS among the wireless data transmission sessions; and activating, by the first virtual TSN bridge, the virtual TSN port mapped to the wireless data transmission session that is connected to the second virtual TSN bridge and satisfies QoS among the wireless data transmission sessions.

With the apparatus and method for transmitting data according to the present technology, it is possible to provide a method in which a set up stream is made seamless by using a time sensitive network even when a communication device moves.

DETAILED DESCRIPTION

In describing embodiments of the present disclosure, specific descriptions of relevant disclosed configurations or features may be omitted if it is determined that such detailed descriptions would obscure the spirit of the disclosure.

As used herein, the terms "comprises," "includes," "may include," and the like as used herein refer to the presence of the corresponding features, operations, components, etc. disclosed and are not intended to limit one or more additional features, operations, components, etc. Further, as used herein, the terms "comprises," "includes" or "has" and the like are intended to designate the presence of the features, numbers, steps, actions, components, parts, or combinations thereof described, and are not intended to preclude the possibility of the presence or addition of one or more other features, numbers, steps, actions, components, parts, or combinations thereof.

In this specification, expressions of the singular include the plural unless the context clearly indicates otherwise. As used herein, an expression "at least one of" preceding a list of elements modifies the entire list of the elements and does not modify the individual elements of the list. For example, an expression, "at least one of a, b, and c" should be understood as including only a, only b, only c, both a and b, both a and c, both b and c, or all of a, b, and c.

Hereinafter, the invention will be described with reference to the accompanying drawings.

Figure 1:
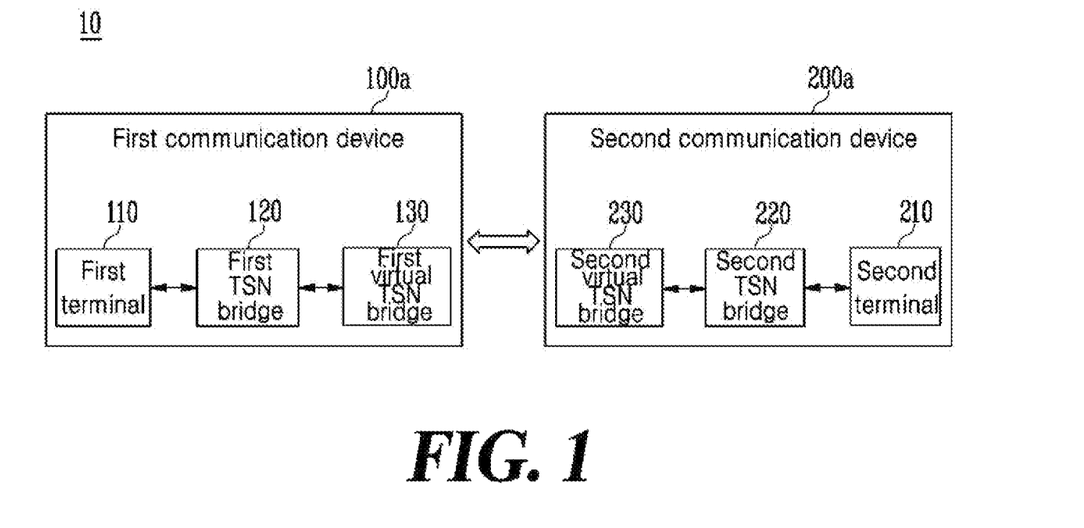
FIG. 1 is a diagram illustrating an example of a communication system according to an embodiment of the present invention.

FIG. 1 is a diagram illustrating an example of a communication system 10 according to an embodiment of the present invention.

Referring to FIG. 1, the communication system 10 may be a communication system that supports distributed time sensitive networks (TSN).

The communication system 10 may include a first communication device 100a and a second communication device 200a. However, the number of communication devices included in the communication system may be three or more, unlike the example shown in FIG. 1.

In an embodiment, a first communication device 100*a* and a second communication device 200*a* may refer to devices that transmit and receive data through wireless communication. Example of the first communication device 100*a* and the second communication device 200*a* may include a railroad vehicle, a personal computer (PC), and a smartphone.

The first communication device 100*a* may include a first terminal 110, a first TSN bridge 120, and a first virtual TSN bridge 130. The second communication device 200*a* may include a second terminal 210, a second TSN bridge 220, and a second virtual TSN bridge 230.

In a time sensitive network, periodically generated consecutive messages can be referred to as a stream. The first terminal 110 and the second terminal 210 may be nodes that generate or receive and consume the stream. Further, the first TSN bridge 120, the first virtual TSN bridge 130, the second TSN bridge 220, and the second virtual TSN bridge 230 may be nodes responsible for transferring traffic.

The first terminal 110 and the second terminal 210 may transmit or receive data through the stream. In this case, the first terminal 110 and the second terminal 210 may perform a stream reservation operation. In the communication system 10, the terminal and the bridge may perform the stream reservation operation while transmitting or receiving request and indication messages. The first terminal 110 may be connected to the second terminal 210 through the first TSN bridge 120—first virtual TSN bridge 130—second TSN bridge 220—second virtual TSN bridge 230.

In an embodiment, the first virtual TSN bridge 130 and the second virtual TSN bridge 230 may perform wired communication and wireless communication. The first virtual TSN bridge 130 may receive traffic from the first TSN bridge 120 connected thereto by wire and transmit the traffic to the second virtual TSN bridge 230 wirelessly. Further, the first virtual TSN bridge 130 may wirelessly transmit traffic received from the second virtual TSN bridge 230 to the first TSN bridge 120 connected thereto by wire. The first communication device 100*a* and the second communication device 200*a* may store accumulated latency time for a reserved stream according to the IEEE 802.1Q TSN standard, and release the stream reservation when the accumulated latency time changes.

Meanwhile, the above-described embodiment can be equally applied to the second TSN bridge 220 and the second virtual TSN bridge 230.

Figure 2:
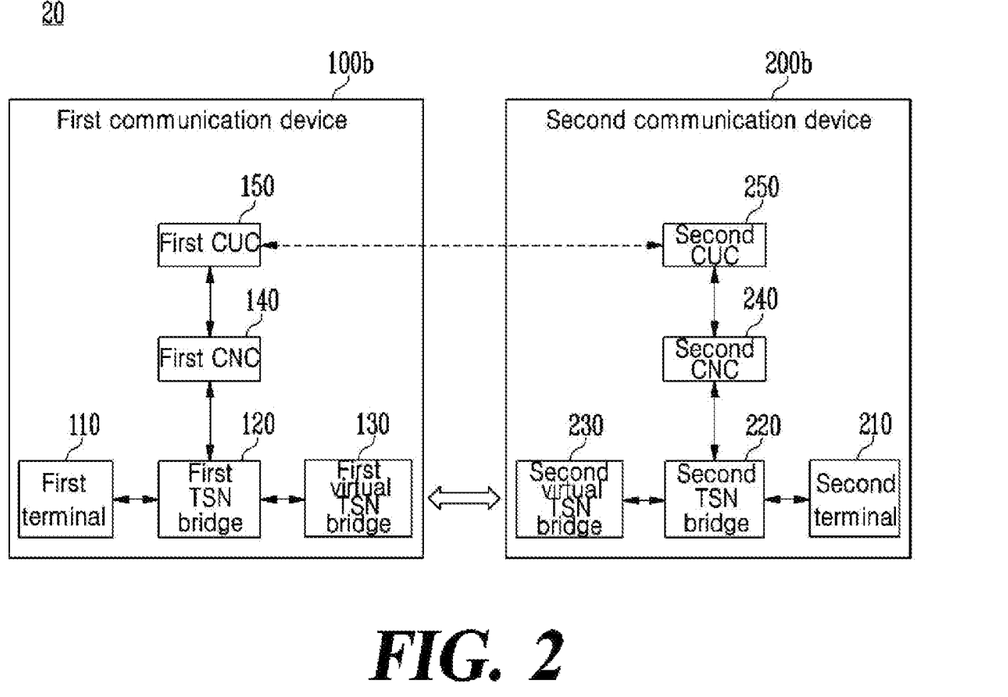
FIG. 2 is a diagram illustrating another example of the communication system according to an embodiment of the present invention.

FIG. 2 is a diagram illustrating another example of the communication system according to the embodiment of the present invention.

Referring to FIG. 2, a communication system 20 may be a communication system that supports centralized time sensitive network (TSN).

The communication system 20 may include a first communication device 100*b* and a second communication device 200*b*.

The first communication device 100*b* includes a first terminal 110, a first TSN bridge 120, a first virtual TSN bridge 130, a first centralized network configuration (CNC) 140, and a first centralized user configuration (CUC) 50. The second communication device 200*a* may include a second terminal 210, a second TSN bridge 220, a second virtual TSN bridge 230, a second CNC 140, and a second CUC 150. Since the first terminal 110, the first TSN bridge 120, the first virtual TSN bridge 130, the second terminal 210, the second TSN bridge 220, and the second virtual TSN bridge 230 are the same as the configuration shown in FIG. 1, detailed description will be omitted.

The first CNC 140 and the second CNC 140 may be a device that serves to collect information from the first TSN bridge 120, the first virtual TSN bridge 130, the second TSN bridge 220, and the second virtual TSN bridge 230 and set up a bridge. The first CUC 150 and the second CUC 150 may be devices that collect and manage requirements for streams from the first terminal 110 and the second terminal 210.

In the centralized type, the first CNC 140 and the second CNC 140 may perform the stream reservation when receiving a stream reservation request from the first terminal 110 and the second terminal 210.

The first communication device 100*b* and the second communication device 200*b* may store the accumulated latency time for the reserved stream according to the IEEE 802.1Q TSN standard, and release the stream reservation when the accumulated latency time changes.

According to an embodiment of the present invention, the virtual TSN bridge may set a plurality of virtual TSN ports in a wireless communication section and set the stream reservation for each virtual TSN port.

Figure 3:
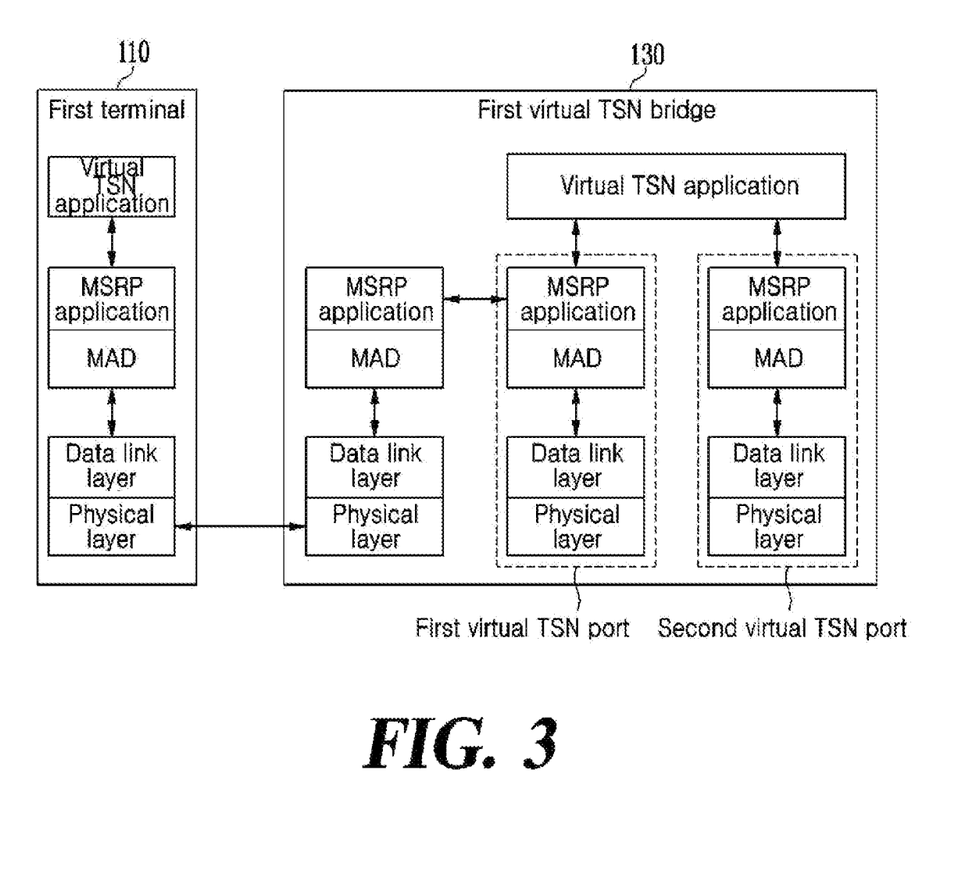
FIG. 3 is a diagram illustrating configurations of a first terminal and a first virtual TSN bridge according to an embodiment of the present invention.

FIG. 3 is a diagram illustrating configurations of the first terminal 110 and the first virtual TSN bridge 130 according to an embodiment of the present invention.

Referring to FIG. 3, the first terminal 110 and the first virtual TSN bridge 130 may include a virtual TSN application, a multi stream reservation protocol (MSRP) application, MAD, a data link layer, and a physical layer.

The virtual TSN application may be a communication application at a higher layer than the data link layer. The virtual TSN application may perform a stream reservation operation. The virtual TSN application can activate or deactivate the virtual TSN ports. Further, the virtual TSN application may transmit and receive signals for forming the virtual TSN bridge.

When the first virtual TSN bridge 130 deactivates a specific stream, the first terminal 110 cannot transmit data through the stream. Further, the data link layer and the physical layer of the first terminal 110 and the first virtual TSN bridge 130 may not know whether the stream is activated or deactivated. The data link layer and the physical layer can recognize that data transmission is not made through the stream.

The virtual TSN application may be a higher layer application than the MSRP application. When an additional communication application is needed in addition to the MSRP application, the communication application may be added to a lower layer of the virtual TSN application. When there is no MSRP application, the virtual TSN application may be located on a layer immediately on the data link layer.

The virtual TSN application can set the plurality of virtual TSN ports within a single wireless communication technology. Further, the virtual TSN application may set different virtual TSN ports for different wireless communication technologies. For example, when the first virtual TSN bridge 130 and the second virtual TSN bridge 230 perform communication using a 5G communication technology, the plurality of virtual TSN ports may be formed within the 5G communication technology. As another example, when the first virtual TSN bridge 130 and the second virtual TSN bridge 230 are connected using a 5G communication technology and a Wi-Fi communication technology, one or more virtual TSN port may be formed in the 5G communication technology and the Wi-Fi communication technology.

In an embodiment, the plurality of virtual TSN ports may constitute a virtual TSN port group. For example, virtual TSN ports formed within the same wireless communication technology can constitute one virtual TSN port group. For example, when m virtual TSN ports are formed using the 5G communication technology and n virtual TSN ports are formed using the Wi-Fi communication technology, the m virtual TSN ports may constitute a first virtual port group, and the n virtual TSN ports may constitute a second virtual port group. That is, when the virtual TSN port group is the same, this may generally mean that the same wireless communication technology is used.

In an embodiment, when a virtual TSN port group includes the plurality of virtual TSN ports, the virtual TSN port may be mapped one-to-one to a wireless data transmission session (or flow). Thus, the virtual TSN ports are mapped to different wireless data transmission sessions, other virtual TSN ports can continuously perform communication even when a specific wireless data transmission session is created or terminated according to a movement of the first terminal 110 and a channel change. For example, when the first virtual TSN bridge 130 and the second virtual TSN bridge 230 are connected using the 5G communication technology or LTE communication technology, the first virtual TSN port may be mapped to a default bearer with an EPS bearer ID of 5, and the second virtual TSN port may be mapped to a dedicated bearer with an EPS bearer ID of 9.

In an embodiment, the stream group may include a plurality of streams, and there may be a plurality of stream groups. The inclusion of the plurality of streams in the stream group may mean using the plurality of streams for the same data transmission. To increase the safety of the communication system, communication paths may be set up through different virtual TSN ports for the streams in the same stream group. Therefore, when a specific virtual TSN port is deactivated, data can be transmitted seamlessly using the other streams in the same stream group. The plurality of streams in the same stream group may be mapped to virtual TSN ports included in different virtual TSN port groups. Further, the plurality of streams in the same stream group may be mapped to different virtual TSN ports among the virtual TSN ports included in the same virtual TSN port group.

Meanwhile, the embodiment described with reference to FIG. 3 can be similarly applied to the second terminal 210 and the second virtual TSN bridge 230.

Figure 4:
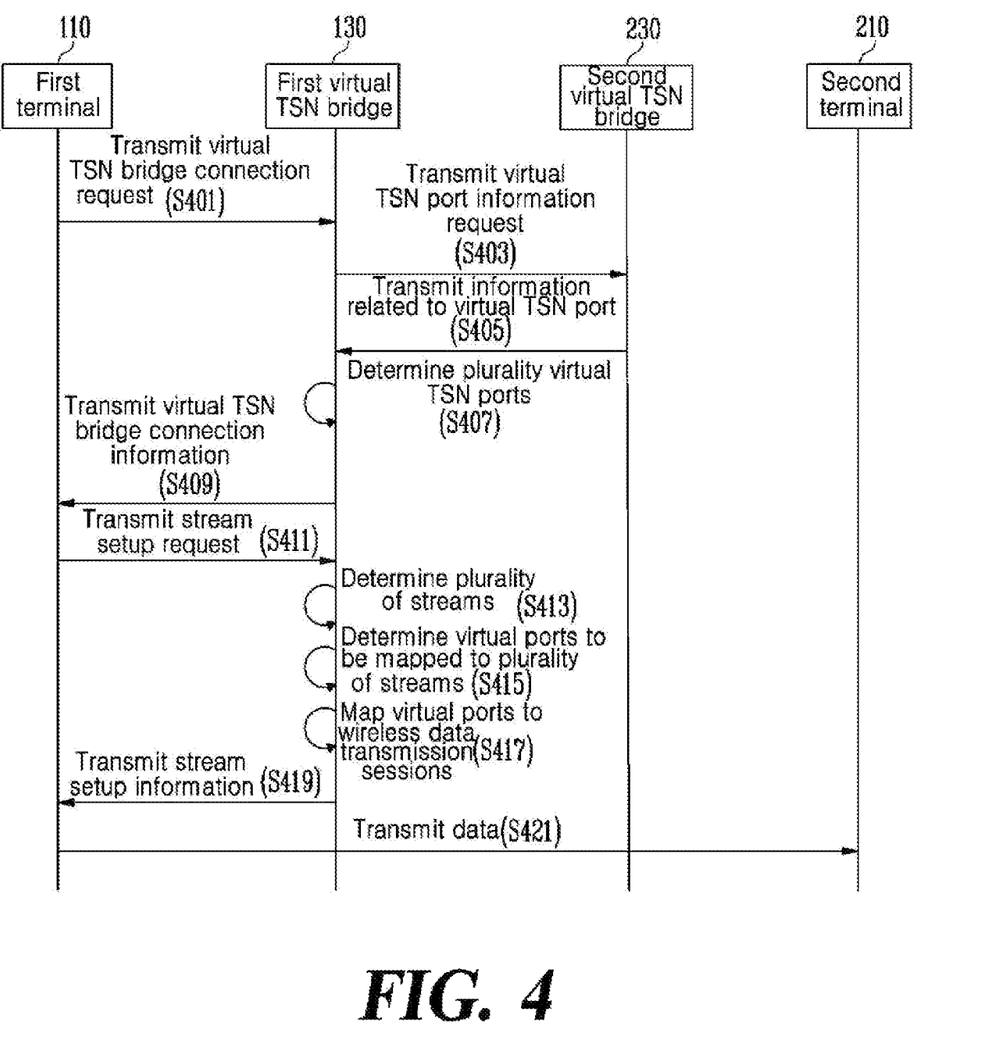
FIG. 4 is a flowchart illustrating a method for transmitting data according to an embodiment of the present invention.

FIG. 4 is a flowchart illustrating a method for transmitting data according to an embodiment of the present invention.

The method shown in FIG. 4 may be, for example, performed by the first communication device 100a and the second communication device 200a of FIG. 1 or the first communication device 100b and the second communication device 200b of FIG. 2. An embodiment in which the first terminal 110 requests a virtual TSN bridge connection will be de described for convenience of description in FIG. 4, but the following embodiments can be similarly applied even to a case where the second terminal 210 requests the virtual TSN bridge connection. Meanwhile, the first terminal 110 may store identification information of the second terminal 210 and the second virtual TSN bridge 230 in advance. Further, the second terminal 210 may store identification information of the first terminal 110 and the first virtual TSN bridge 130 in advance.

Referring to FIG. 4, in step S401, the first terminal 110 may transmit a virtual TSN bridge connection request to the first virtual TSN bridge 130.

In an embodiment, the virtual TSN bridge connection request may include at least one of the identification information of the second virtual TSN bridge 230 and a time stamp.

In step S403, the first virtual TSN bridge 130 may transmit a virtual TSN port information request to the second virtual TSN bridge 230 according to the virtual TSN bridge connection request.

In an embodiment, the virtual TSN port information request may include at least one of the number of virtual TSN port groups included in the first virtual TSN bridge 130, the number of virtual TSN ports for each virtual TSN port group included in the first virtual TSN bridge 130, a first latency time between the first virtual TSN bridge 130 and the first terminal 110, and a time stamp. The first latency time may be a time difference between a point in time when the first virtual TSN bridge 130 receives the virtual TSN bridge connection request and the time stamp included in the virtual TSN bridge connection request. Meanwhile, when the second terminal 210 transmits the virtual TSN bridge connection request to the second virtual TSN bridge 230, the second latency time between the second virtual TSN bridge 230 and the second terminal 210 may be a time difference between a point in time when the second virtual TSN bridge 230 receives the virtual TSN bridge connection request and the time stamp included in the virtual TSN bridge connection request.

In an embodiment, the first virtual TSN bridge 130 may transmit the virtual TSN port information request through a wireless communication technology corresponding to each of one or more virtual TSN port groups included in the first virtual TSN bridge 130.

For example, when one virtual TSN port group is included in the first virtual TSN bridge 130, the first virtual TSN bridge 130 may transmit the virtual TSN port information request through one wireless communication technology. As another example, when the first virtual TSN bridge 130 includes a plurality of virtual TSN port groups, the first virtual TSN bridge 130 may transmit the virtual TSN port information request through wireless communication technology corresponding to each of the plurality of virtual TSN port groups. When there is a wireless communication technology incapable of communication connection among a plurality of wireless communication technologies, the first virtual TSN bridge 130 may not transmit the virtual TSN port information request through the wireless communication technology.

In step S405, the second virtual TSN bridge 230 transmits the information related to the virtual TSN port included in the second virtual TSN bridge 230 to the first virtual TSN bridge 130 in response to the virtual TSN port information request.

In an embodiment, the information related to the virtual TSN port may include at least one of the number of virtual TSN port groups that have received the virtual TSN port information request from the virtual TSN port groups of the first virtual TSN bridge 130 among the virtual TSN port groups included in the second virtual TSN bridge 230, the number of virtual TSN ports for each virtual TSN port group that has received the virtual TSN port information request, a third latency time taken for the virtual TSN port information request for each virtual TSN port group that have received the virtual TSN port information request to travel from the first virtual TSN bridge 130 to the second virtual TSN bridge 230, a second latency time between the second virtual TSN bridge 230 and the second terminal 210, and a time stamp.

The virtual TSN port group that has received the virtual TSN port information request from the virtual TSN port groups of the first virtual TSN bridge 130 may represent a virtual TSN port group currently capable of communication connection.

The third latency time may be a time difference between a time when the virtual TSN port information request is received and the time stamp included in the virtual TSN port information request. The third latency time may be calculated for each virtual TSN port group.

In an embodiment, the second virtual TSN bridge 230 may transmit the information related to the virtual TSN port through a wireless communication technology corresponding to each of one or more virtual TSN port groups included in the second virtual TSN bridge 230.

For example, when the second virtual TSN bridge 230 includes one virtual TSN port group, the second virtual TSN bridge 230 may transmit the information related to the virtual TSN port through one wireless communication technology. As another example, when the second virtual TSN bridge 230 includes a plurality of virtual TSN port groups, the second virtual TSN bridge 230 may transmit the information related to the virtual TSN port through the wireless communication technology corresponding to each of the plurality of virtual TSN port groups.

In step S407, the first virtual TSN bridge 130 may determine the plurality of virtual TSN ports to be used for communication with the second virtual TSN bridge 230 in the first virtual TSN bridge 130 based on the information related to the virtual TSN port.

In an embodiment, the first virtual TSN bridge 130 may determine virtual TSN port groups that have received the information related to the virtual TSN port among the virtual TSN port groups included in the first virtual TSN bridge 130. In this case, the first virtual TSN bridge 130 may confirm whether the number of virtual TSN port groups that have received the information related to the virtual TSN port is the same as the number of virtual TSN port groups included in the first virtual TSN bridge 130. When the number of virtual TSN port groups that have received the information related to the virtual TSN port is smaller than the number of virtual TSN port groups included in the first virtual TSN bridge 130, the virtual TSN port groups that have received the information related to the virtual TSN port may be determined as virtual TSN ports to be used for communication. The first virtual TSN bridge 130 may store the number of virtual TSN port groups that have received the information related to the virtual TSN port.

In an embodiment, the first virtual TSN bridge 130 may determine the virtual TSN ports included in the virtual TSN port groups that that have received the information related to the virtual TSN port as virtual TSN ports to be used for communication with the second virtual TSN bridge 230. The first virtual TSN bridge 130 may store the number of virtual TSN ports included in the virtual TSN port groups that have received the information related to the virtual TSN port.

In an embodiment, the first virtual TSN bridge 130 may calculate a fourth latency time taken for the information related to the virtual TSN port for each virtual TSN port group that has received the information related to the virtual TSN port to travel from the second virtual TSN bridge 230 to the first virtual TSN bridge 130. The fourth latency time may be a time difference between a point in time when the information related to the virtual TSN port has been received and the time stamp included in the information related to the virtual TSN port. The fourth latency time can be calculated for each virtual TSN port group.

In step S409, the first virtual TSN bridge 130 may transmit virtual TSN bridge connection information to the first terminal. In an embodiment, the virtual TSN bridge connection information may include at least one of the identification information of the second virtual TSN bridge 230, the number of virtual TSN port groups to be used for communication with the second virtual TSN bridge 230, the number of virtual TSN ports for each virtual TSN port group to be used for communication, and a fifth latency time between the first terminal 110 and the second terminal 210 for each virtual TSN port group to be used for communication.

In this case, the first virtual TSN bridge 130 may not transmit the virtual TSN bridge connection information through the virtual TSN port.

In an embodiment, the fifth latency time may be calculated using at least two of the first latency time, the second latency time, the third latency time, and the fourth latency time.

For example, when the first virtual TSN bridge 130 knows the third latency time, the fifth latency time may be calculated as a sum of the first latency time, the second latency time, and the third latency time. As another example, when the first virtual TSN bridge 130 does not know the third latency time and knows the fourth latency time, the fifth latency time may be calculated as a sum of the first latency time, the second latency time, and the fourth latency time. As another example, when the first virtual TSN bridge 130 does not know the second latency time, the fifth latency time may be calculated as a sum of twice the first latency time and the third latency time.

In step S411, the first terminal 110 may transmit a stream setup request to the first virtual TSN bridge 130. For example, when the first terminal 110 needs communication through the first virtual TSN bridge 130, the first terminal 110 can determine the number of stream groups to be connected to the second terminal. Further, the first terminal 110 may determine quality of service (QoS) for each stream group and then transmit the stream setup request to the first virtual TSN bridge 130.

In an embodiment, the stream setup request may include at least one of the number of stream groups to be set up and QoS for each stream group. QoS for each stream group may include the fifth latency time, reliability for each stream group, error rate, data rate, traffic characteristics, etc. In this case, traffic characteristics may include at least one of guaranteed bit rate (GBR) or Non GBR, delay critical data (time sensitive packet), a traffic class of the time sensitive network (class CDT, A, B, or BE), a priority code point (generally 3 bits), a drop eligible indicator (typically 1 bit), and a VLAN ID (typically 12 bits).

In step S413, the first virtual TSN bridge 130 may determine a plurality of streams to be used for communication with the second virtual TSN bridge 230 based on the stream setup request.

In an embodiment, the first virtual TSN bridge 130 may calculate a sixth latency time between the first terminal 110 and the second terminal 210 for each of the plurality of virtual TSN ports. In this case, the sixth latency time can be calculated based on the fifth latency time.

Further, the first virtual TSN bridge 130 can extract reliability, data rate, and traffic characteristics for each virtual TSN port.

Further, the first virtual TSN bridge 130 may determine the number of streams included in each stream group and the QoS for each stream. The stream group having a plurality of streams may mean setting up a plurality of streams for transmission of one piece of data. In this case, the streams included in one stream group may have the same QoS. For example, the first terminal 110 may request setup of a plurality of streams for class control data traffic (CDT) transmission in the time sensitive network. The streams included in one stream group may be mapped to different virtual TSN ports. Therefore, the number of streams included in the stream group cannot exceed the number of virtual TSN ports.

In step S415, the first virtual TSN bridge 130 may determine the virtual TSN ports to be mapped to the plurality of streams among the plurality of virtual TSN ports based on the number of the plurality of streams.

In an embodiment, the first virtual TSN bridge 130 may determine the number of the virtual TSN ports to be mapped to the plurality of streams so that the number of the virtual TSN ports is larger than the number of streams included in each stream group. That is, the number of virtual TSN ports must be larger than the number of streams in the stream group. Further, the number of virtual TSN ports may not be larger than a total number of streams.

Further, the first virtual TSN bridge 130 may determine the number of the wireless data transmission sessions. Since the virtual TSN ports are mapped one-to-one to the wireless data transmission session, the number of virtual TSN ports may be equal to the number of the wireless data transmission sessions. Further, the first virtual TSN bridge 130 can extract QoS for each wireless data transmission session.

In step S417, the first virtual TSN bridge 130 may map the virtual TSN ports to be mapped to the plurality of streams to the wireless data transmission sessions.

In an embodiment, the first virtual TSN bridge 130 deactivate the virtual TSN port mapped to the wireless data transmission session that is not connected to the second virtual TSN bridge 230 or does not satisfy QoS among the wireless data transmission sessions.

Further, the first virtual TSN bridge 130 may activate the virtual TSN port that is mapped to the wireless data transmission session that is connected to the second virtual TSN bridge 230 and satisfies QoS among the wireless data transmission sessions.

In step S419, the first virtual TSN bridge 130 may transmit stream setup information to the first terminal 110 in response to the stream setup request.

In an embodiment, the stream setup information may include at least one of the number of streams for each stream group, QoS for each stream group, the determined number of virtual TSN ports for each virtual TSN port group, and information on whether the virtual TSN port is activated.

Meanwhile, according to the embodiment, the first terminal 110 may set up each stream using protocol of the time sensitive network in order to set up a stream for communication with the second terminal 210. In this case, the first terminal 110 may set up the stream using the SRP or the first CNC 140. The virtual TSN application can provide the MSRP application with information for stream setup.

In step S421, the first terminal 110 may transmit data to the second terminal 210 through any one of one or more streams mapped to the activated virtual TSN port.

That is, the first terminal 110 and the second terminal 210 can communicate through any one of one or more streams mapped to the activated virtual TSN port. For example, the first terminal 110 and the second terminal 210 can transmit data only using a stream passing through an activated virtual TSN port. Further, when the plurality of streams are present in a stream group, the first terminal 110 can transmit data using the stream with the best QoS.

Meanwhile, the first virtual TSN bridge 130 may periodically update activation information of each virtual TSN port.

Various modifications and variations will be apparent to one of ordinary skill in the art to which the present invention belongs without departing from the essential features of the invention. The embodiments disclosed herein and in the drawings are for the purpose of illustrating the invention and providing specific examples for ease of understanding, and are not intended to limit the scope of the invention. Therefore, the scope of the invention should be construed to include all modifications or variations derived from the technical ideas of the invention in addition to the embodiments disclosed herein.

What is claimed is:

1. A method for transmitting data between a first communication device comprising a first terminal and a first virtual time sensitive network (TSN) bridge and a second communication device comprising a second terminal and a second virtual TSN bridge, the method for transmitting data comprising:
    transmitting, by the first terminal, a virtual TSN bridge connection request to the first virtual TSN bridge;
    transmitting, by the first virtual TSN bridge, a virtual TSN port information request to the second virtual TSN bridge according to the virtual TSN bridge connection request;
    transmitting, by the second virtual TSN bridge, information related to a virtual TSN port included in the second virtual TSN bridge to the first virtual TSN bridge; and
    determining, by the first virtual TSN bridge, a plurality of virtual TSN ports to be used for communication between the first virtual TSN bridge and the second virtual TSN bridge based on the information related to the virtual TSN port.

2. The method for transmitting data of claim 1, wherein the virtual TSN bridge connection request comprises at least one of identification information of the second virtual TSN bridge, and a time stamp,
    wherein the virtual TSN port information request comprises at least one of a number of virtual TSN port groups included in the first virtual TSN bridge, a number of virtual TSN ports for each virtual TSN port group included in the first virtual TSN bridge, a latency time between the first virtual TSN bridge and the first terminal, and a time stamp, and
    wherein the information related to the virtual TSN port comprises at least one of a number of virtual TSN port groups that have received the virtual TSN port information request among virtual TSN port groups included in the second virtual TSN bridge, a number of virtual TSN ports for each virtual TSN port group that has received the virtual TSN port information request, a latency time taken for the virtual TSN port information request for each virtual TSN port group that has received the virtual TSN port information request to travel from the first virtual TSN bridge to the second virtual TSN bridge, a latency time between the second virtual TSN bridge and the second terminal, and a time stamp.

3. The method for transmitting data of claim 1, wherein the transmitting of the virtual TSN port information request comprises transmitting, by the first virtual TSN bridge, the virtual TSN port information request to the second virtual TSN bridge through a wireless communication technology corresponding to each of one or more virtual TSN port groups included in the first virtual TSN bridge, and wherein the transmitting of the information related to the virtual TSN port comprises transmitting, by the second virtual TSN bridge, the information related to the virtual TSN port to the first virtual TSN bridge through a wireless communication technology corresponding to each of one or more virtual TSN port groups included in the second virtual TSN bridge.

4. The method for transmitting data of claim 1, wherein the determining of the plurality of virtual TSN ports comprises:
   determining, by the first virtual TSN bridge, virtual TSN port groups that have received the information related to the virtual TSN port among virtual TSN port groups included in the first virtual TSN bridge;
   determining, by the first virtual TSN bridge, virtual TSN ports included in the virtual TSN port groups that have received the information related to the virtual TSN port as the virtual TSN ports to be used for communication with the second virtual TSN bridge; and
   calculating, by the first virtual TSN bridge, a latency time taken for the information related to the virtual TSN port for each virtual TSN port group that has received the information related to the virtual TSN port to travel from the second virtual TSN bridge to the first virtual TSN bridge.

5. The method for transmitting data of claim 1, further comprising:
   transmitting, by the first virtual TSN bridge, virtual TSN bridge connection information to the first terminal,
   wherein the virtual TSN bridge connection information comprises at least one of identification information of the second virtual TSN bridge, a number of virtual TSN port groups to be used for communication with the second virtual TSN bridge, a number of virtual TSN ports for each virtual TSN port group to be used for the communication, and latency times between the first terminal and the second terminal for each virtual TSN port group to be used for the communication.

6. The method for transmitting data of claim 5, further comprising:
   transmitting, by the first terminal, a stream setup request to the first virtual TSN bridge;
   determining, by the first virtual TSN bridge, a plurality of streams to be used for communication with the second virtual TSN bridge based on the stream setup request;
   determining, by the first virtual TSN bridge, the virtual TSN ports to be mapped to the plurality of streams among the plurality of virtual TSN ports based on a number of the plurality of streams;
   mapping, by the first virtual TSN bridge, the virtual TSN ports to be mapped to the plurality of streams, to wireless data transmission sessions; and
   transmitting, by the first virtual TSN bridge, stream setup information to the first terminal.

7. The method for transmitting data of claim 6, wherein the stream setup request comprises at least one of a number of stream groups and quality of service (QOS) for each stream group, and
   wherein the stream setup information comprises at least one of a number of streams for each stream group, QoS for each stream group, the number of virtual TSN ports determined for each virtual TSN port group, and information on whether the virtual TSN port is activated or information on whether the virtual TSN port is not activated.

8. The method for transmitting data of claim 7, wherein the determining of the plurality of streams comprises:

calculating, by the first virtual TSN bridge, a latency time between the first terminal and the second terminal for each of the plurality of virtual TSN ports;
extracting, by the first virtual TSN bridge, reliability, data rate, and traffic characteristics for each of the plurality of virtual TSN ports; and
determining, by the first virtual TSN bridge, the number of streams included in each of the stream groups, and QoS for each stream.

9. The method for transmitting data of claim 7, wherein the determining of the virtual TSN ports to be mapped to the plurality of streams comprises:
   determining, by the first virtual TSN bridge, the number of virtual TSN ports to be mapped to the plurality of streams so that the number is larger than the number of streams included in each of the stream groups;
   determining, by the first virtual TSN bridge, a number of wireless data transmission sessions; and
   extracting, by the first virtual TSN bridge, QoS for each wireless data transmission session.

10. The method for transmitting data of claim 6, wherein the mapping comprises:
    deactivating, by the first virtual TSN bridge, a virtual TSN port mapped to a wireless data transmission session that is not connected to the second virtual TSN bridge or does not satisfy QoS among the wireless data transmission sessions; and
    activating, by the first virtual TSN bridge, a virtual TSN port mapped to a wireless data transmission session that is connected to the second virtual TSN bridge and satisfies QoS among the wireless data transmission sessions.

11. The method for transmitting data of claim 1, wherein the first terminal, the first virtual TSN bridge, the second terminal, and the second virtual TSN bridge comprise a virtual TSN application that transmits or receives signals for connecting the first virtual TSN bridge to the second virtual TSN bridge.

12. The method for transmitting data of claim 6, further comprising:
    mapping, by the first virtual TSN bridge, streams included in a same stream group among the plurality of streams to different virtual TSN ports; and
    mapping, by the first virtual TSN bridge, streams included in different stream groups among the plurality of streams to a same virtual TSN port.

13. A device comprising a first terminal and a first virtual time sensitive network (TSN) bridge which transmits data to another device comprising a second terminal and a second virtual TSN bridge,
    wherein the device is configured to perform at least one of:
    transmitting, by the first terminal, a virtual TSN bridge connection request to the first virtual TSN bridge;
    transmitting, by the first virtual TSN bridge, a virtual TSN port information request to the second virtual TSN bridge according to the virtual TSN bridge connection request;
    receiving, by the first virtual TSN bridge, information related to a virtual TSN port included in the second virtual TSN bridge from the second virtual TSN bridge; and
    determining, by the first virtual TSN bridge, a plurality of virtual TSN ports to be used for communication between the first virtual TSN bridge and the second virtual TSN bridge based on the information related to the virtual TSN port.

* * * * *